UNITED STATES PATENT OFFICE.

GUSTAVE SCHLUETER, OF BROOKLYN, NEW YORK, ASSIGNOR, BY MESNE ASSIGNMENTS, TO THE ALABASTINE COMPANY, OF NEW YORK.

COMPOSITION FOR MOLDING FROM PLASTER-OF-PARIS.

SPECIFICATION forming part of Reissued Letters Patent No. 9,848, dated August 23, 1881.

Original No. 99,355, dated February 1, 1870. Application for reissue filed January 8, 1880.

DIVISION A.

*To all whom it may concern:*

Be it known that I, GUSTAVE SCHLUETER, of Brooklyn, Kings county, State of New York, have invented a new and useful Improvement in Ornamenting and Coloring Plaster-of-Paris and other Cements; and I do hereby declare that the following is a full, clear, and exact description thereof, which will enable others skilled in the art to make and use the same.

The object of this improvement is to impart ornamental colors to plaster-of-paris, so that when mixed with water the colored ornamented plaster may be cast or molded into any desired form, or may be applied to walls, ceilings, &c. The improved article, produced as hereinafter described, I denominate "illuminated plaster."

One method of carrying out my invention is to take of the ordinary dry ground plaster-of-paris about eight ounces, with which I mix about one ounce of any desired dry coloring-matter and one-eighth of an ounce of finely-pulverized gum-arabic. The gum and coloring-matter are to be thoroughly incorporated with the plaster, after which water is added in such quantity as may be requisite to give to the mixture the desired consistency for casting or molding or application to walls, ceilings, &c., which is done in the well-known manner. Articles thus molded or cast, or to which it is applied, will present the ornamental color originally imparted to the dry plaster; and as the coloring-matter is thoroughly incorporated the color cannot fade or be destroyed by use or abrasion.

The surfaces of articles composed of my improved illuminated plaster may be readily polished by rubbing with a woolen cloth or other suitable fabric.

Any of the ordinary painters' dry-colors, such as ocher, vermilion, umber, sienna, ultramarine, or bronze powders, may be employed. I prefer the use of gum-arabic in the manner I have described, because I find that it hardens and toughens the plaster-of-paris; but other gums and other adhesive substances, such as glue and gelatine, may be employed.

I do not limit myself to the precise proportions of the ingredients herein mentioned, nor to the precise order or method of mixing them, as these may be varied in many ways without departing from my invention. For example, the coloring-matter and the gum, or either of them, may be mixed with water, and the mixture then incorporated with the plaster; or the materials may be mixed together in a dry state and put up into suitable packages to be sold as one article, the necessary amount of water to be added when used.

Having thus described my invention, what I claim as new, and desire to secure by Letters Patent, is—

A compound of gum or adhesive matter with plaster and coloring-matter in a dry state, substantially as set forth.

GUSTAVE SCHLUETER.

Witnesses:
J. H. TAYLOR,
JAMES MAXWELL.